T. C. HARGRAVE.
Harvester.
No. 32,233. Patented April 30, 1861.
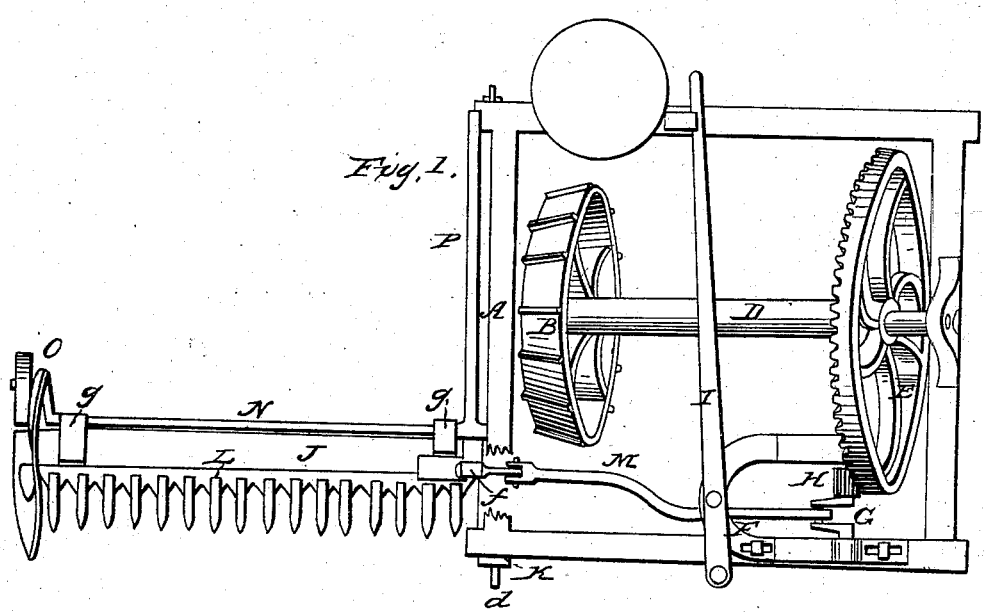
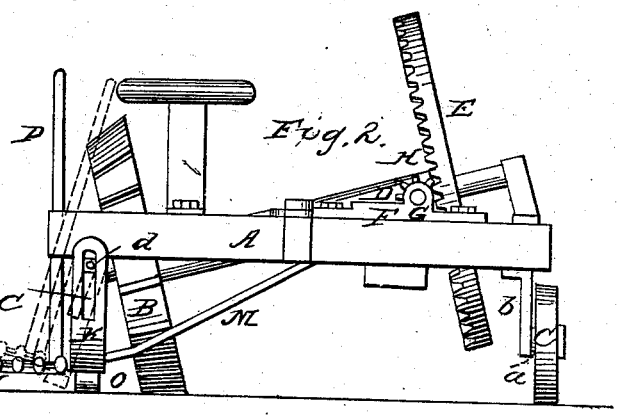
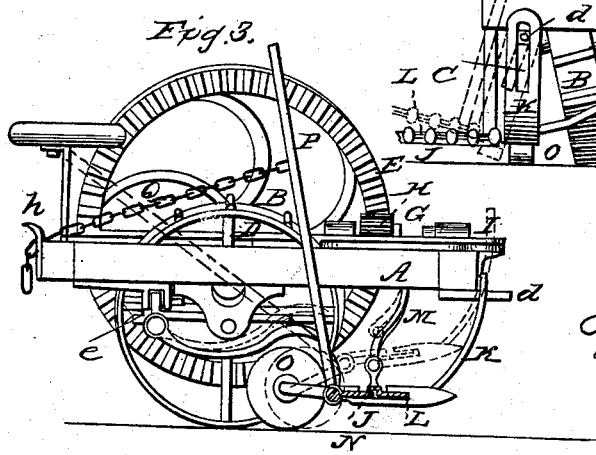

UNITED STATES PATENT OFFICE.

T. C. HARGRAVES, OF SCHENECTADY, NEW YORK, ASSIGNOR TO H. M. CRANE, OF SAME PLACE.

IMPROVEMENT IN HARVESTING-MACHINES.

Specification forming part of Letters Patent No. 32,233, dated April 30, 1861.

*To all whom it may concern:*

Be it known that I, T. C. HARGRAVES, of Schenectady, in the county of Schenectady and State of New York, have invented a new and Improved Grain and Grass Harvester; and I do hereby declare that the following is a full, clear, and exact description of the same, reference being had to the annexed drawings, making part of this specification, in which—

Figure 1 is a plan or top view of my invention; Fig. 2, a front elevation of same; Fig. 3, a side view of same, the sickle and finger-bar being bisected transversely.

Similar letters of reference indicate corresponding parts in the several figures.

To enable those skilled in the art to fully understand and construct my invention, I will proceed to describe it.

A is a rectangular frame, which is supported by or mounted upon the wheels B C, one of which, B, is the driving-wheel, and is placed on an inclined axle, D, fitted in suitable bearings attached to the frame A. The wheel C is much smaller in diameter than B, and has its axle $a$ attached to a pendant, $b$, of the frame A.

On the inclined axle D, and at the end opposite to that where the wheel B is placed, there is secured a toothed wheel, E. This wheel E is considerably larger in diameter than the wheel B, and this increase in size is admitted in consequence of the inclination of the axle D. The wheel E may just clear the ground.

On the frame A, at its front part, there is placed a sliding U-shaped bar, F, in which a small crank-shaft, G, is fitted, said shaft having a pinion, H, upon it, into which the wheel E gears when the machine is in operation. The sliding bar F has a lever, I, connected to it, by adjusting which the bar F may be moved and the pinion H thrown in and out of gear with the wheel E, as may be desired.

J is the finger-bar, which is attached at one end to a bar, K, the latter being secured to the frame A. This bar K is of curved form, its front end being rounded upward, and having an oblong longitudinal slot, $c$, made in it, through which a pin, $d$, attached to frame A, passes. The back part of the bar K is attached by a double or universal joint, $e$, to the frame A.

On the finger-bar J a sickle, L, of the usual reciprocating kind is placed, and the inner end of this sickle is connected by a swivel-link, $f$, to a connecting-rod, M, which is attached to the crank of the shaft G. To the back part of the finger-bar J there is placed a shaft, N. This shaft is fitted within suitable bearings, $g$ $g$, and each end beyond its bearings is bent in crank form, and has a wheel, O, attached, said wheels running on the ground. To the shaft N a lever, P, is attached, said lever having a chain, Q, connected to its upper part, the back part of the chain fitting on a hook, $h$, at the back part of the frame A.

From the above description it will be seen that the finger-bar J may rise and fall bodily in a horizontal position, or that either end may rise and fall, the way in which the bar J is attached to the frame A—to wit, by means of the universal joint $e$ and the pin $d$, passing through slot $c$—admitting of such result. By adjusting the lever P through the medium of the chain Q or its equivalent the finger-bar J and sickle may be adjusted in a more or less elevated state to cut the desired height from the surface of the ground.

By having the axle D inclined I am enabled to employ a large toothed wheel, E, on said axle, and thereby get up the proper speed for driving the sickle in the most direct and simple manner possible, for two gear-wheels are only employed. This is an important feature of the invention, for it greatly simplifies the machine and reduces its draft.

I do not claim the lever P and shaft N, with the wheel O attached, for elevating the finger-bar J and sickle L, for they or their equivalents have been used; but

Having thus described my invention, what I claim as new, and desire to secure by Letters Patent, is—

Having the driving-shaft D arranged in an inclined position, as herein shown and described, so that a toothed wheel, E, of larger diameter than the driving-wheel B, may be employed on said shaft, all as set forth, for the purposes specified.

T. C. HARGRAVES.

Witnesses:
JAMES FULLER,
HENRY M. CRANE.